(12) United States Patent
Liu

(10) Patent No.: US 10,856,258 B2
(45) Date of Patent: Dec. 1, 2020

(54) PAGING FAILURE PROCESSING METHOD, ACCESS NETWORK DEVICE, AND CORE NETWORK DEVICE

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/626,287

(22) PCT Filed: Aug. 4, 2017

(86) PCT No.: PCT/CN2017/096077
§ 371 (c)(1),
(2) Date: Dec. 23, 2019

(87) PCT Pub. No.: WO2019/024103
PCT Pub. Date: Feb. 7, 2019

(65) Prior Publication Data
US 2020/0120635 A1    Apr. 16, 2020

(51) Int. Cl.
*H04W 68/02* (2009.01)
*H04W 68/00* (2009.01)
*H04W 76/30* (2018.01)

(52) U.S. Cl.
CPC ......... *H04W 68/02* (2013.01); *H04W 68/005* (2013.01); *H04W 76/30* (2018.02)

(58) Field of Classification Search
CPC ............. H04W 72/1221; H04W 76/27; H04W 36/765; H04W 76/36; H04W 68/005;
(Continued)

(56) References Cited

U.S. PATENT DOCUMENTS 8,817,705 B2 * 8/2014 Yin .................. H04L 69/16
370/328
9,247,471 B2 * 1/2016 Velev .................. H04W 68/005
(Continued)

FOREIGN PATENT DOCUMENTS

CN    102291820 A    12/2011
CN    103687008 A    3/2014
(Continued)

OTHER PUBLICATIONS

International Search Report in the international application No. PCT/CN2017/096077, dated Apr. 28, 2018.
(Continued)

*Primary Examiner* — William D Cumming
(74) *Attorney, Agent, or Firm* — Perkins Coie LLP

(57) ABSTRACT

A paging failure processing method, an access network device, and a core network device are disclosed. The method includes: in a case in which downlink data of a terminal device needs to be transmitted, an access network device determines that a paging initiated by the access network to the terminal device failed; and the access network device transmits first indication information to a core network device, the first indication information being used for indicating that the paging initiated by the access network device to the terminal device failed.

15 Claims, 4 Drawing Sheets

(58) Field of Classification Search
CPC ... H04W 4/70; H04W 76/38; H04W 72/0413; H04W 58/02; H04W 58/00; H04W 58/68; H04W 68/02; H04W 12/06; H04W 36/165; H04W 36/560035
USPC ............ 370/252, 331; 455/404.1, 422.1, 458
See application file for complete search history.

(56) References Cited

U.S. PATENT DOCUMENTS

| | | | | |
|---|---|---|---|---|
| 9,247,528 | B2* | 1/2016 | Bhaskaran | H04W 56/0035 |
| 9,265,087 | B2* | 2/2016 | Lee | H04W 76/30 |
| 9,532,331 | B2* | 12/2016 | Bhaskaran | H04W 56/0015 |
| 9,648,657 | B2* | 5/2017 | Pelletier | H04W 76/27 |
| 9,894,579 | B2* | 2/2018 | Velev | H04W 68/005 |
| 10,462,840 | B2* | 10/2019 | Dao | H04W 76/30 |
| 10,477,445 | B2* | 11/2019 | Velev | H04W 36/165 |
| 2006/0040681 | A1* | 2/2006 | Julka | H04W 68/02 455/458 |
| 2007/0218889 | A1* | 9/2007 | Zhang | H04W 72/0413 455/422.1 |
| 2009/0181700 | A1* | 7/2009 | Willey | H04W 68/02 455/458 |
| 2011/0310804 | A1* | 12/2011 | Beygzadeh | H04W 68/00 370/328 |
| 2012/0093086 | A1* | 4/2012 | Yin | H04L 69/16 370/328 |
| 2012/0135701 | A1* | 5/2012 | Zhu | H04W 68/00 455/404.1 |
| 2012/0281566 | A1* | 11/2012 | Pelletier | H04W 76/27 370/252 |
| 2013/0203450 | A1* | 8/2013 | Mochizuki | H04W 68/02 455/458 |
| 2013/0343280 | A1* | 12/2013 | Lee | H04W 12/06 370/328 |
| 2014/0016614 | A1* | 1/2014 | Velev | H04W 36/165 370/331 |
| 2014/0105028 | A1* | 4/2014 | Bhaskaran | H04W 56/0035 370/242 |
| 2014/0357256 | A1 | 12/2014 | Bromell et al. | |
| 2015/0173121 | A1 | 6/2015 | Miklos et al. | |
| 2016/0127968 | A1* | 5/2016 | Velev | H04W 68/005 370/331 |
| 2016/0142999 | A1* | 5/2016 | Bhaskaran | H04W 68/12 455/458 |
| 2017/0231029 | A1* | 8/2017 | Pelletier | H04W 76/27 |
| 2018/0139671 | A1* | 5/2018 | Velev | H04W 76/38 |
| 2018/0198867 | A1* | 7/2018 | Dao | H04W 36/0016 |
| 2018/0199240 | A1* | 7/2018 | Dao | H04W 36/14 |
| 2018/0199398 | A1* | 7/2018 | Dao | H04W 76/30 |
| 2018/0206288 | A1* | 7/2018 | Pelletier | H04W 72/1221 |
| 2019/0132900 | A1* | 5/2019 | Hong | H04W 8/08 |
| 2019/0230625 | A1* | 7/2019 | Kim | H04W 76/27 |
| 2020/0015314 | A1* | 1/2020 | Dao | H04W 76/10 |
| 2020/0029237 | A1* | 1/2020 | Kim | H04W 24/10 |
| 2020/0029388 | A1* | 1/2020 | Dao | H04W 76/30 |
| 2020/0120592 | A1* | 4/2020 | Geng | H04W 36/08 |
| 2020/0120635 | A1* | 4/2020 | Liu | H04W 68/02 |

FOREIGN PATENT DOCUMENTS

| | | |
|---|---|---|
| WO | 2013107831 A2 | 7/2013 |
| WO | 2014021770 A2 | 2/2014 |
| WO | 2017074250 A1 | 5/2017 |

OTHER PUBLICATIONS

Catt, "RAN paging failure", 3GPP TSG RAN WG3 Meeting #95, R3-170466, Feb. 17, 2017 (Feb. 17, 2017), pp. 1-3.
Catt, "Discussion on RAN paging failure", 3GPP TSG-RAN WG3 NR AdHoc, R3-172379, Jun. 29, 2017 (Jun. 29, 2017), pp. 1-2.
Qualcomm Incorporated: "RRC-Inactive Principles", 3GPP Draft; R2-1706881_RRC Inactive Principles, 3rd Generation Partnership Project (3GPP), Mobile Competence Centre; 650, Route des Lucioles, F-06921 Sophia-Anti Polis Cedex; France vol. RAN WG2, No. Qingdao, China; Jun. 27, 2017-Jun. 29, 2017 Jun. 26, 2017 (Jun. 26, 2017) XP051301378, Retrieved from the Internet: URL:http://www.3gpp.org/ftp/Meetings_3GPP_Sync/RAN2/Docs/ [retrieved on Jun. 26, 2017] paragraph 2.
"3rd Generation Partnership Project; Technical Specification Group Services and System Aspects; Study of system level impacts due to introduction of light connection for LTE in EPS (Release 15)", 3GPP Standard; Technical Report; 3GPP TR 23. 723, 3rd Generation Partnership Project (3GPP), Mobile Competence Centre; 650, Route des Lucioles; F-06921 Sophia-Antipolis Cedex; France, vol. SA WG2, No. V0.2.0, Jun. 1, 2017 (Jun. 1, 2017), pp. 1-36, XP051298316, [retrieved on Jun. 1, 2017] *paragraphs 5.1, 6.13.1 to 6.13.2.
Supplementary European Search Report in the European application No. 17920439.1, dated Feb. 7, 2020.

* cited by examiner

100

| Under the condition that downlink data for a terminal device is needed to be transmitted, an access network device determines that paging initiated to the terminal device by the access network device failed | ~ S110 |

| The access network device transmits first indication information to a CN device, the first indication information indicates that paging initiated to the terminal device by the access network device failed | ~ S120 |

| The access network device transmits delivery-indication information to the CN device | ~ S130 |

| A CN device receives first indication information transmitted by an access network device, the first indication information indicates that paging initiated to a terminal device by the access network device failed | ~ S210 |

| The CN device initiates paging to the terminal device according to the first indication information | ~ S220 |

FIG. 3

PAGING FAILURE PROCESSING METHOD, ACCESS NETWORK DEVICE, AND CORE NETWORK DEVICE

CROSS-REFERENCE TO RELATED APPLICATIONS

The application is the U.S. national phase of International Application No. PCT/CN2017/096077 filed on Aug. 4, 2017, the disclosure of which is incorporated by reference herein in its entirety.

TECHNICAL FIELD

Embodiments of the disclosure relate to the field of communication, and more particularly to a paging failure processing method, an access network device and a Core Network (CN) device.

BACKGROUND

Paging is a signaling flow implemented when a network looks for a terminal, and a callee in the network is required to respond by paging for normal communication. In a 5th-Generation (5G) system, when downlink data for a terminal arrives, a Residential Access Network (RAN) may initiate paging to the terminal. At present, when the RAN fails in paging, a network side may discard the present data, but it is very likely that such a paging failure occurs because of an access network itself. Consequently, data transmission reliability is relatively low.

SUMMARY

In view of this, the embodiments of the disclosure provide a paging failure processing method, an access network device and a CN device, which may improve data transmission reliability.

A first aspect provides a paging failure processing method, which may include the following operations. Under the condition that downlink data for a terminal device is needed to be transmitted, an access network device determines that paging initiated to the terminal device by the access network device failed. The access network device transmits first indication information to a CN device. The first indication information indicates that paging initiated to the terminal device by the access network device failed.

The access network device may initiate paging to the terminal device at first, and under the condition that paging initiated by the access network device failed, the CN device may initiate paging instead, so that the probability that the data is transmitted out may be increased, and data transmission reliability is further improved.

In a possible implementation mode, the operation that the access network device determines that paging initiated to the terminal device by the access network device failed may include that: the access network device determines that paging initiated to the terminal device by the access network device failed according to a timer duration or a maximum count N of a paging message transmitted to the terminal device by the access network device, N being a positive integer.

The timer duration or the maximum count N may be determined according to a load condition of an access network or some other characteristics of the access network.

In a possible implementation mode, the operation that the access network device determines that paging initiated to the terminal device by the access network device failed according to the timer duration may include that: responsive to not receiving any response message for the paging message within the timer duration, the access network device determines that paging initiated to the terminal device by the access network device failed.

In a possible implementation mode, the operation that the access network device determines that paging initiated to the terminal device by the access network device failed according to the maximum count N of the paging message transmitted to the terminal device by the access network device may include that: responsive to not receiving any response message for each paging message of N paging messages, the access network device determines that paging initiated to the terminal device by the access network device failed.

Responsive to determining that no response message for paging may be received after initiating one paging, the access network device may transmit initiate paging again to the terminal device. And every time when transmitting the paging message, the access network device may also not need to wait for a period of time to determine whether a response message for a paging message may be received.

Optionally, it may also be judged in advance directly based on performance of the access network device that paging may fail. In such case, the access network device may directly tell the CN device that paging initiated by it may fail, the CN device may select to directly initiate paging to the terminal device, or may instruct the access network device to continue initiating paging and, after paging initiated by the access network device failed, the CN device initiates paging.

In a possible implementation mode, the method may further include the following operations. The access network device determines the timer duration or maximum count N corresponding to the terminal device. Or, the access network device determines the timer duration or maximum count N corresponding to a bearer of the downlink data for the terminal device. Or, the access network device determines the timer duration or maximum count N corresponding to a data stream of the downlink data for the terminal device.

Optionally, a network device may configure one or more parameters used to judge whether paging failed for each terminal device in advance. The network device may be a CN device and may also be an access network device.

In a possible implementation mode, the method may further include that: the access network device receives configuration information transmitted by the CN device. The configuration information indicates the timer duration or the maximum count N.

In a possible implementation mode, the first indication information may be carried in a connection release request message, and the connection release request message is used to request for releasing connection in relation to the terminal device between the CN device and the access network device.

After determining that paging initiated to the terminal device failed, the access network device may independently transmit a piece of indication information to the CN device to indicate that the paging failed and may also carry the indication information in some existing messages.

In a possible implementation mode, the first indication information may further indicate the CN device to release the connection of the terminal device between the CN device and the access network device.

In a possible implementation mode, before the operation that the access network device determines that paging initiated to the terminal device by the access network device failed, the method may further include that: the access network device transmits the paging message to the terminal device.

In a possible implementation mode, the operation that the access network device transmits the paging message to the terminal device may include that: under the condition that the access network device receives the downlink data for the terminal device from the CN device, the access network device transmits the paging message to the terminal device.

In a possible implementation mode, after the operation that the access network device determines that paging initiated to the terminal device by the access network device failed, the method may further include that: the access network device transmits the downlink data for the terminal device received by the access network device back to the CN device.

In a possible implementation mode, the operation that the access network device transmits the paging message to the terminal device may include the following operations. The access network device receives second indication information transmitted by the CN device. The second indication information indicates that there is downlink data for the terminal device to be transmitted. The access network device transmits the paging message to the terminal device according to the second indication information.

In a possible implementation mode, after the operation that the access network device determines that paging initiated to the terminal device by the access network device failed, the method may further include that: the access network device transmits third indication information (or delivery-indication information) to the CN device. The third indication information (or the delivery-indication information) indicates that the terminal device is undeliverable or the downlink data for the terminal device to be transmitted cannot be transmitted.

The access network device also multiplexes the first indication information to indicate that the terminal device is undeliverable or the downlink data for the terminal device to be transmitted cannot be transmitted.

A second aspect provides a paging failure processing method, which may include the following operations. A CN device receives first indication information transmitted by an access network device. The first indication information indicates that paging initiated to a terminal device by the access network device failed. And The CN device initiates paging to the terminal device according to the first indication information.

In a possible implementation mode, the method may further include that: the CN device releases connection of the terminal device between the CN device and the access network device according to the first indication information.

In a possible implementation mode, the first indication information may be carried in a connection release request message. The connection release request message is used to request releasing for the connection of the terminal device between the CN device and the access network device. And the method may further include that: the CN device releases the connection of the terminal device between the CN device and the access network device according to the connection release request message.

In a possible implementation mode, before the operation that the CN device receives the first indication information transmitted by the access network device, the method may further include that: the CN device transmits downlink data for the terminal device to the access network device. In a possible implementation mode, the method may further include that: the CN device receives the downlink data for the terminal device transmitted back by the access network device.

In a possible implementation mode, before the operation that the CN device receives the first indication information transmitted by the access network device, the method may further include that: the CN device transmits second indication information to the access network device. The second indication information indicates that there is downlink data for the terminal device to be transmitted.

In a possible implementation mode, after the operation that the CN device transmits the second indication information to the access network device, the method may further include that: the CN device receives third indication information transmitted by the access network device. The third indication information indicates that the terminal device is undeliverable or the downlink data for the terminal device to be transmitted cannot be transmitted.

In a possible implementation mode, the method may further include that: the CN device transmits configuration information, used to determine that paging initiated to the terminal device by the access network device failed, to the access network device. The configuration information indicates a timer duration or a maximum count N of a paging message transmitted to the terminal device by the access network device and N being a positive integer.

A third aspect provides an access network device, which is configured to execute the method in the first aspect or any possible implementation mode of the first aspect. Specifically, the access network device includes units configured to execute the method in the first aspect or any possible implementation mode of the first aspect.

A fourth aspect provides a CN device, which is configured to execute the method in the second aspect or any possible implementation mode of the second aspect. Specifically, the CN device includes units configured to execute the method in the second aspect or any possible implementation mode of the second aspect.

A fifth aspect provides an access network device, which includes a memory, a processor, an input interface and an output interface. The memory, the processor, the input interface and the output interface are connected through a bus system. The memory is configured to store an instruction. The processor is configured to execute the instruction stored in the memory to execute the method in the first aspect or any possible implementation mode of the first aspect.

A sixth aspect provides a CN device, which includes a memory, a processor, an input interface and an output interface. The memory, the processor, the input interface and the output interface are connected through a bus system. The memory is configured to store an instruction. The processor is configured to execute the instruction stored in the memory to execute the method in the second aspect or any possible implementation mode of the second aspect.

A seventh aspect provides a computer storage medium, which is configured to store a computer software instruction for executing the method in the first aspect or any possible implementation mode of the first aspect or the method in the second aspect or any possible implementation mode of the second aspect, including a program designed to execute the above mentioned aspects.

An eighth aspect provides a computer program product including an instruction, which runs in a computer to enable the computer to execute the method in the first aspect or any optional implementation mode of the first aspect or the method in the second aspect or any optional implementation mode of the second aspect.

These aspects or other aspects of the disclosure will become clearer and easier to understand through the following descriptions about the embodiments.

BRIEF DESCRIPTION OF DRAWINGS

FIG. 2 is a schematic block diagram of a paging failure processing method according to an embodiment of the disclosure.

FIG. 3 is another schematic block diagram of a paging failure processing method according to an embodiment of the disclosure.

DETAILED DESCRIPTION

Figure 1:
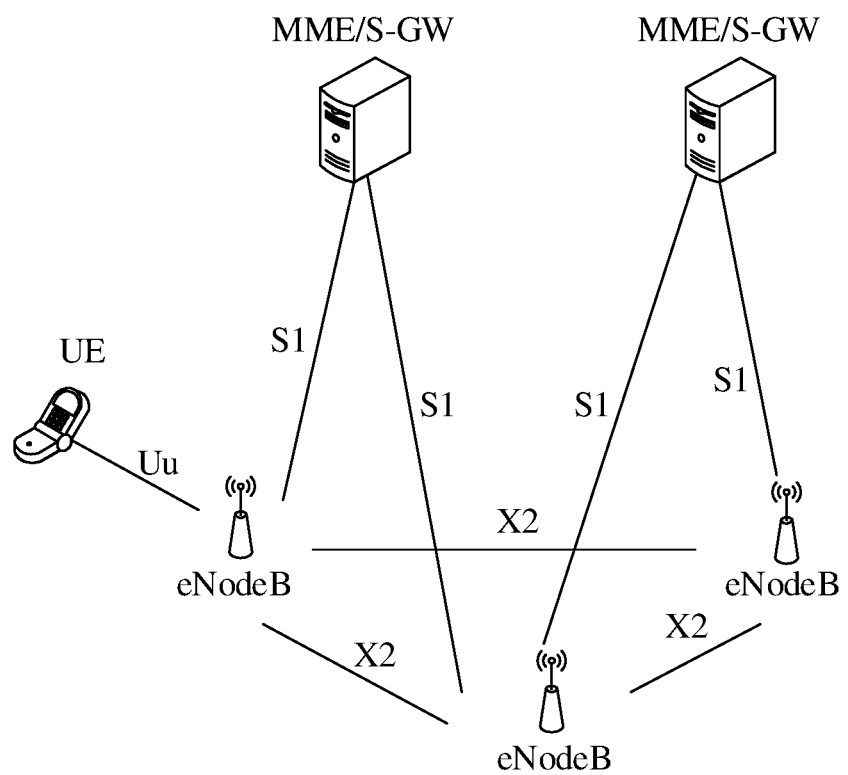
FIG. 1 is a schematic diagram of an disclosure scenario according to an embodiment of the disclosure.

The technical solutions in the embodiments of the disclosure will be clearly and completely described below in combination with the drawings in the embodiments of the disclosure.

It is to be understood that the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, a New Radio (NR) or future 5G system.

Particularly, the technical solutions of the embodiments of the disclosure may be applied to various nonorthogonal multiple access technology-based communication systems, for example, a Sparse Code Multiple Access (SCMA) system and a Low Density Signature (LDS) system, and of course, the SCMA system and the LDS system may also have other names in the field of communication. Furthermore, the technical solutions of the embodiments of the disclosure may be applied to multi-carrier transmission systems adopting nonorthogonal multiple access technologies, for example, Orthogonal Frequency Division Multiplexing (OFDM), Filter Bank Multi-Carrier (FBMC), Generalized Frequency Division Multiplexing (GFDM) and Filtered-OFDM (F-OFDM) systems adopting the nonorthogonal multiple access technologies.

In the embodiments of the disclosure, a terminal device may refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, terminal device in a future 5G network, terminal device in a future evolved Public Land Mobile Network (PLMN) or the like. There are no limits made in the embodiments of the disclosure.

In the embodiments of the disclosure, an access network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. Or the network device may be a relay station, an access point, a vehicle device, a wearable device, a network device in the future 5G network, a network device in the future evolved PLMN or the like. There are no limits made in the embodiments of the disclosure.

In the embodiments of the disclosure, a CN device may be a Mobility Management Entity (MME) and may also be a Serving Gateway (S-GW) or a Packet Data Network Gateway (P-GW), etc. The embodiments of the disclosure are not limited thereto.

FIG. 1 is a schematic diagram of an disclosure scenario according to an embodiment of the disclosure. As shown in FIG. 1, an LTE system architecture is divided into two parts, and includes MMEs/S-GWs and eNodeBs. The eNodeB is connected with UE through a Uu interface, which provides protocol termination points to a control plane and user plane of the UE. The eNodeBs are connected with each other through X2 interfaces, and there is always an X2 interface between two different eNodeBs needed to communicate. LTE access network is connected with CN through Si interfaces, and the Si interface supports a many-many contact manner.

Under a normal condition, a main purpose of paging is to establish a signaling connection between UE and an Evolved Packet Core (EPC) for subsequent signaling or data transmission. In a 5G system, when downlink data for a terminal device arrives, paging may be initiated to the terminal device through a RAN, and paging may also be initiated to the terminal device through a CN. However, under a normal condition, if the RAN fails in paging, the downlink data is undeliverable, and consequently, data transmission reliability may be affected.

FIG. 2 is a schematic block diagram of a paging failure processing method 100 according to an embodiment of the disclosure. As shown in FIG. 2, the method 100 includes part or all of the following contents.

In S110, under the condition that downlink data for a terminal device is needed to be transmitted, an access network device determines that paging initiated to the terminal device by the access network device failed.

In S120, the access network device transmits first indication information to a CN device. The first indication information indicates that paging initiated to the terminal device by the access network device failed.

Specifically, when the CN device is needed to transmit downlink data to the terminal device, paging may be initiated to the terminal device through the access network device. The access network device judges based on a certain rule that paging initiated by the access network device failed. The certain rule may be, for example, that the access network device may determine that paging initiated to the terminal device failed if the access network device does not receive any response for a paging message within a certain time after transmitting the paging message to the terminal device. After the access network device determines that the paging initiated to the terminal device by it failed, the access network device may transmit indication information (e.g., first indication information) to the CN device to notify the CN device that paging of the access network device failed. And furthermore, the CN device may initiate paging again to the terminal device based on the downlink data of this part.

In such a manner, according to the paging failure processing method of the embodiment of the disclosure, after determining that paging failed, the access network device notifies the CN device to initiate paging, so that data transmission reliability may be improved. For example, the access network device transmits delivery-indication information to the CN device. The delivery-indication information indicates that data cannot be delivered to the terminal device or the downlink data for the terminal device to be transmitted cannot be transmitted (S130).

That is, in the embodiment of the disclosure, the access network device may initiate paging to the terminal device at first. And under the condition that paging initiated by the access network device failed, the CN device may initiate paging instead, so that the probability that the data is transmitted out may be increased, and the data transmission reliability is further improved.

Optionally, in the embodiment of the disclosure, the operation that the access network device determines that paging initiated to the terminal device by the access network device failed includes that: the access network device determines that paging initiated to the terminal device by the access network device failed according to a timer duration or a maximum count N of a paging message transmitted to the terminal device by the access network device, N being a positive integer.

How to judge that paging of the access network device failed according to the timer duration or the maximum count N will be described below respectively.

Optionally, in the embodiment of the disclosure, if the access network device does not receive any response message for the paging message within the timer duration, the access network device determines that paging initiated to the terminal device by the access network device failed.

For example, a duration may be set for a timer, and the timer is started when the access network device transmits the paging message to the terminal device. If the access network device receives a response message for the paging message before timeout of the timer, the access network device may determine that paging initiated to the terminal device succeeds. If the access network device has yet not received any response message for the paging message in case of timeout of the timer, the access network device may determine that paging initiated to the terminal device failed.

It is to be understood that the timer duration is determined according to a load condition of an access network or some other characteristics of the access network. For example, if a load of the present access network device is excessively heavy, the access network device may set the timer duration to be short, then the access network device may rapidly judge whether paging failed, and if paging failed, the CN device may initiate paging instead. For another example, if the load of the present access network device is relatively light, the access network device may set the timer duration to be long, and then sufficient time may be reserved for the access network device to judge whether paging failed to prevent unnecessary waste brought by re-initiation of paging by the CN device due to a relatively short waiting time under the condition that paging of the access network device succeeds.

Optionally, in the embodiment of the disclosure, if the access network device does not receive any response message for each paging message of N paging messages, the access network device determines that paging initiated to the terminal device by the access network device failed.

For example, if the access network device does not receive any response within a certain time after initiating paging once to the terminal device, the access network device may not determine that paging failed at this time and may initiate paging again to the terminal device. If the access network device does not receive any response after the access network device continuously initiates paging to the terminal device for many times, the access network device may determine that paging failed. That is, the maximum count N may be configured. For example, N may be 5. If the access network device, after initiating paging for five times, does not receive any response of the terminal device for paging of the five times, the access network device may determine that paging initiated to the terminal device by the access network device failed.

It is to be understood that every time when transmitting the paging message, the access network device may also not need to wait for a period of time to determine whether a response message for a paging message may be received, and then transmit a second paging message if not receiving the response message. The access network device may continuously transmits N paging messages to the terminal device directly, and wait for a period of time after completing transmitting the last paging message. If a response for the paging message is received within the period of time, it may be determined that paging succeeds. If response for the paging message is still not received after waiting for the period of time, the access network device may determine that paging initiated to the terminal device by the access network device failed. How the access network device transmits multiple paging messages is not limited in the embodiment of the disclosure.

It is also to be understood that the maximum count N may also be determined according to the load condition of the access network or some other characteristics of the access network. References may be made to a determination manner for the timer duration.

It is further to be understood that in the context of the disclosure, the timer duration and the maximum count are adopted as parameters for judging whether paging failed. The embodiment of the disclosure should not be limited thereto. For example, in the embodiment of the disclosure, it may also be judged in advance directly based on performance of the access network device that paging may fail. In such case, the access network device may directly tell the CN device that paging initiated by it may fail. The CN device may select to directly initiate paging to the terminal device, or may instruct the access network device to continue initiating paging and, after paging initiated by the access network device failed, the CN device initiates paging.

Optionally, in the embodiment of the disclosure, the method further includes that the following operations. The access network device determines the timer duration or maximum count N corresponding to the terminal device. Or the access network device determines the timer duration or maximum count N corresponding to a bearer of the downlink data for the terminal device. Or the access network device determines the timer duration or maximum count N corresponding to a data stream of the downlink data for the terminal device.

Specifically, a network device may configure one or more parameters used to judge whether paging failed for each terminal device in advance. When the access network device acquires the specific terminal device to which the paging is initiated, the access network device may directly look up one or more parameters corresponding to the terminal device in a configuration table. For example, the network device may configure multiple timer durations for each terminal device in advance. The access network device may look up the multiple timer durations for the terminal device to be paged, and the access network device may further select one of the multiple timer durations as a parameter for judging whether paging initiated by the access network device failed based on a certain rule. The network device may also configure one or more parameters used to judge whether paging failed for each bearer in advance. When the access network device acquires the specific bearer adopted for the downlink data which to be transmitted to the terminal device, the access network device may directly look up the one or more parameters corresponding to the bearer in the configuration table. For example, the network device may configure multiple maximum counts N for each bearer in advance, the access network device may look up the multiple maximum counts N for the bearer for downlink data to be transmitted, and the access network device may further select one of the multiple maximum counts N as a parameter for judging whether paging initiated by the access network device failed based on a certain rule. For another example, the network device may configure multiple timers for a data stream, the access network device may look up the multiple timers for the data stream of the downlink data to be transmitted, and the access network device may further select one of the multiple timers as a parameter for judging whether paging initiated by the access network device failed based on a certain rule.

Optionally, in the embodiment of the disclosure, the method further includes that: the access network device receives configuration information transmitted by the CN device. The configuration information indicates the timer duration or the maximum count N.

That is, the maximum count N and the timer duration may be determined by the CN device. Specifically, they may be directly configured by the CN device; or a CN may configure an abovementioned mapping table in advance, and during use, the CN looks up then in the mapping table and transmits them to the access network device.

Optionally, in the embodiment of the disclosure, the first indication information is carried in a connection release request message. The connection release request message is used to request for releasing a connection of the terminal device between the CN device and the access network device.

Specifically, after determining that paging initiated to the terminal device failed the access network device may independently transmit a piece of indication information to the CN device to indicate that paging failed, and may also carry the indication information in some existing messages, for example, the connection release request message. Then, when receiving the connection release request message, the CN device may obtain two pieces of information. The first is that paging of the access network device failed. The second is that the CN device releases the connection of the terminal device established with the access network device. Furthermore, the CN device may directly release the connection of the terminal device established with the access network device according to a content indicated by the connection release request message.

Optionally, in the embodiment of the disclosure, the first indication information further indicates the CN device to release the connection of the terminal device between the CN device and the access network device. The first indication information may also be directly multiplexed to indicate the CN device to release the connection of the terminal device established with the access network device.

It is to be understood that how the access network device specifically indicates the CN device that paging failed is not limited in the embodiment of the disclosure.

Optionally, in the embodiment of the disclosure, the access network device may also initiate paging to the terminal device in many manners. For example, the CN device may transmit the downlink data for the terminal device to the access network device. The access network device may transmit the paging message to the terminal device after the access network device receives the downlink data. If the access network device determines that paging initiate to the terminal device failed, the access network device may further transmit the downlink data of this part back to the CN device. The CN device then initiates paging to the terminal device. If the CN succeeds in paging, then transmits the downlink data of this part to the terminal device. For another example, the CN device may also not transmit the downlink data for the terminal device to the access network device but transmit a piece of indication information to the access network device at first to notify the access network device that there is downlink data for the terminal device to be transmitted. Then the access network device may transmit the paging message to the terminal device after receiving the indication information. The access network device may indicate the CN device that the terminal device is undeliverable or the downlink data for the terminal device cannot be transmitted after the access network device determines that paging failed. Then the CN device may not transmit the downlink data for the terminal device at first. The CN device may initiate paging to the terminal device at first. After the terminal device is successfully paged, transmit the downlink data to the terminal device.

It is to be understood that, when the access network device performs paging according to the received downlink data and the paging failed, the access network device may also directly transmit the downlink data back to the CN device. The CN device may determine that paging initiated to the terminal device by the access network device failed once receiving the downlink data from the access network device. The access network device may also carry the indication information in the downlink data transmitted back to the CN device to notify the CN device that paging initiated to the terminal device by the access network device failed.

It is also to be understood that, if the access network device performs paging according to the received indication information and the paging failed, the access network device may transmit indication information to the CN device to indicate that paging of the access network device failed. The access network device may also transmit another piece of indication information to the CN device to notify the CN device not to transmit the downlink data for the terminal device. The two pieces of indication information may be carried in the same message and may also multiplex the same bit. For example, one bit may be adopted to indicate whether paging failed and may also be adopted to indicate whether the downlink data may be transmitted. There are no limits made thereto in the embodiment of the disclosure.

FIG. 3 is a schematic block diagram of a paging failure processing method 200 according to an embodiment of the disclosure. As shown in FIG. 3, the method 200 includes part or all of the following contents.

In S210, a CN device receives first indication information transmitted by an access network device. The first indication information indicates that paging initiated to a terminal device by the access network device failed.

In S220, the CN device initiates paging to the terminal device according to the first indication information.

In such a manner, according to the paging failure processing method of the embodiment of the disclosure, after determining that paging failed, the access network device notifies the CN device to initiate paging, so that data transmission reliability may be improved.

Optionally, in the embodiment of the disclosure, the method further includes that: the CN device releases a connection of the terminal device between the CN device and the access network device according to the first indication information.

Optionally, in the embodiment of the disclosure, the first indication information is carried in a connection release request message. The connection release request message is used to request for releasing the connection of the terminal device between the CN device and the access network device. The method further includes that: the CN device releases the connection of the terminal device between the CN device and the access network device according to the connection release request message.

Optionally, in the embodiment of the disclosure, before the operation that the CN device receives the first indication information transmitted by the access network device, the method further includes that: the CN device transmits downlink data for the terminal device to the access network device.

Optionally, in the embodiment of the disclosure, the method further includes that: the CN device receives the downlink data for the terminal device transmitted back by the access network device.

Optionally, in the embodiment of the disclosure, before the operation that the CN device receives the first indication information transmitted by the access network device, the method further includes that: the CN device transmits second indication information to the access network device. The second indication information indicates that there is downlink data for the terminal device to be transmitted.

Optionally, in the embodiment of the disclosure, after the operation that the CN device transmits the second indication information to the access network device, the method further includes that: the CN device receives third indication information transmitted by the access network device. The third indication information indicates that the terminal device is undeliverable or the downlink data to be transmitted cannot be transmitted.

It is to be understood that interaction between the CN device and the access network device and related characteristics, functions and the like described from the CN device correspond to related characteristics and functions of the access network device. That is, if the access network device transmits information to the CN device, the CN device may correspondingly receive the information. For simplicity, no more elaborations will be made herein.

It is also to be understood that, in various embodiments of the disclosure, a magnitude of a sequence number of each above process does not mean an execution sequence. The execution sequence of each process should be determined by its function and an internal logic and should not form any limit to an implementation process of the embodiments of the disclosure.

The paging failure processing method according to the embodiments of the disclosure is described above in detail. A paging failure processing device according to the embodiments of the disclosure will be described below in combination with FIG. 4 to FIG. 7. The technical characteristics described in the method embodiments are applied to the following device embodiments.

Figure 4:
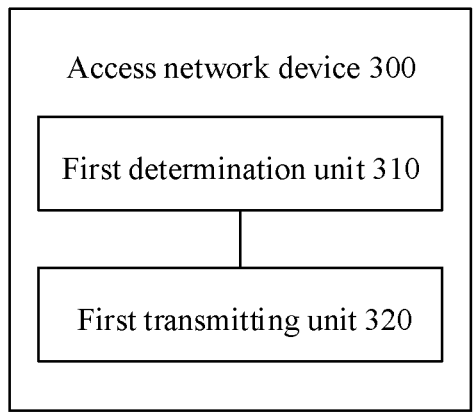
FIG. 4 is a schematic block diagram of an access network device according to an embodiment of the disclosure.

FIG. 4 is a schematic block diagram of an access network device 300 according to an embodiment of the disclosure. As shown in FIG. 4, the access network device 300 includes a first determination unit 310 and a first transmitting unit 320.

The first determination unit 310 is configured to, under the condition that downlink data for a terminal device is needed to be transmitted, determine that paging initiated to the terminal device by the access network device failed.

The first transmitting unit 320 is configured to transmit first indication information to a CN device, the first indication information being configured to indicate that paging initiated to the terminal device by the access network device failed.

In such a manner, the access network device of the embodiment of the disclosure, after determining that paging failed, notifies the CN device to initiate paging, so that data transmission reliability may be improved.

Optionally, in the embodiment of the disclosure, the first determination unit is specifically configured to determine that paging initiated to the terminal device by the access network device failed according to a timer duration or a maximum count N of a paging message transmitted to the terminal device by the access network device, N being a positive integer.

Optionally, in the embodiment of the disclosure, the first determination unit is specifically configured to, if the access network device does not receive any response message for the paging message within the timer duration, determine that paging initiated to the terminal device by the access network device failed.

Optionally, in the embodiment of the disclosure, the first determination unit is specifically configured to, if the access network device does not receive any response message for each paging message of N paging messages, determine that paging initiated to the terminal device by the access network device failed.

Optionally, in the embodiment of the disclosure, the access network device further includes a second determination unit. The second determination unit is configured to determine the timer duration or maximum count N corresponding to the terminal device, or determine the timer duration or maximum count N corresponding to a bearer of the downlink data for the terminal device, or determine the timer duration or maximum count N corresponding to a data stream of the downlink data for the terminal device.

Optionally, in the embodiment of the disclosure, the access network device further includes a receiving unit. The receiving unit is configured to receive configuration information transmitted by the CN device. The configuration information indicates the timer duration or the maximum count N.

Optionally, in the embodiment of the disclosure, the first indication information is carried in a connection release request message, and the connection release request message is used to request for releasing connection in relation to the terminal device between the CN device and the access network device.

Optionally, in the embodiment of the disclosure, the first indication information is indicates the CN device to release the connection of the terminal device between the CN device and the access network device.

Optionally, in the embodiment of the disclosure, the access network device further includes a second transmitting unit. The second transmitting unit is configured to transmit the paging message to the terminal device.

Optionally, in the embodiment of the disclosure, the second transmitting unit is specifically configured to, under the condition that the access network device receives the downlink data for the terminal device from the CN device, transmit the paging message to the terminal device.

Optionally, in the embodiment of the disclosure, the access network device further includes a third transmitting unit. The third transmitting unit is configured to transmit the downlink data for the terminal device received by the access network device back to the CN device.

Optionally, in the embodiment of the disclosure, the second transmitting unit is specifically configured to receive second indication information transmitted by the CN device. The second indication information indicates that there is downlink data for the terminal device to be transmitted. transmit The paging message is transmitted to the terminal device according to the second indication information.

Optionally, in the embodiment of the disclosure, the access network device further includes a fourth transmitting unit. The fourth transmitting unit is configured to transmit third indication information to the CN device. The third indication information indicates that the terminal device is undeliverable or the downlink data to be transmitted cannot be transmitted.

It is to be understood that the access network device 300 according to the embodiment of the disclosure may correspond to the access network device in the method embodiment of the disclosure. And the abovementioned and other operations and/or functions of each unit in the access network device 300 are adopted to implement the corresponding flows executed by the access network device in the method in FIG. 2 respectively and will not be elaborated herein for simplicity.

Figure 5:
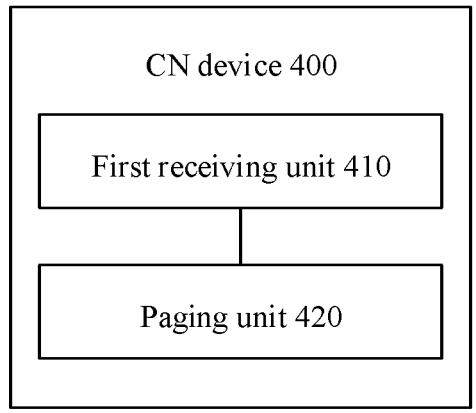
FIG. 5 is a schematic block diagram of a CN device according to an embodiment of the disclosure.

FIG. 5 is a schematic block diagram of a CN device 400 according to an embodiment of the disclosure. As shown in FIG. 5, the CN device 400 includes a first receiving unit 410 and a paging unit 420.

The first receiving unit 410 is configured to receive first indication information transmitted by an access network device. The first indication information indicates that paging initiated to a terminal device by the access network device failed. The paging unit 420 is configured to initiate paging to the terminal device according to the first indication information.

In such a manner, according to the CN device of the embodiment of the disclosure, after the access network device determines that paging failed, the CN device is notified to initiate paging, so that data transmission reliability may be improved.

Optionally, in the embodiment of the disclosure, the CN device further includes a release unit. The release unit is configured to release connection of the terminal device between the CN device and the access network device according to the first indication information.

Optionally, in the embodiment of the disclosure, the first indication information is carried in a connection release request message. The connection release request message is used to request for releasing the connection of the terminal device between the CN device and the access network device. The CN device further includes the release unit. The release unit is configured to release the connection of the terminal device between the CN device and the access network device according to the connection release request message.

Optionally, in the embodiment of the disclosure, the CN device further includes a first transmitting unit. The first transmitting unit is configured to transmit downlink data for the terminal device to the access network device.

Optionally, in the embodiment of the disclosure, the CN device further includes a second receiving unit. The second receiving unit is configured to receive the downlink data for the terminal device transmitted back by the access network device.

Optionally, in the embodiment of the disclosure, the CN device further includes a second transmitting unit. The second transmitting unit is configured to transmit second indication information to the access network device. The second indication information indicates that there is downlink data for the terminal device to be transmitted Optionally, in the embodiment of the disclosure, the CN device further includes a third receiving unit. The third receiving unit is configured to receive third indication information transmitted by the access network device. The third indication information indicates that the terminal device is undeliverable or the downlink data to be transmitted cannot be transmitted.

Optionally, in the embodiment of the disclosure, the CN device further includes a third transmitting unit. The third transmitting unit is configured to transmit configuration information used to determine that paging initiated to the terminal device by the access network device failed to the access network device. The configuration information indicates a timer duration or a maximum count N of a paging message transmitted to the terminal device by the access network device and N being a positive integer.

It is to be understood that the CN device 400 according to the embodiment of the disclosure may correspond to the CN device in the method embodiment of the disclosure. And the abovementioned and other operations and/or functions of each unit in the CN device 400 are adopted to implement the corresponding flows executed by the CN device in the method in FIG. 3 respectively and will not be elaborated herein for simplicity.

Figure 6:
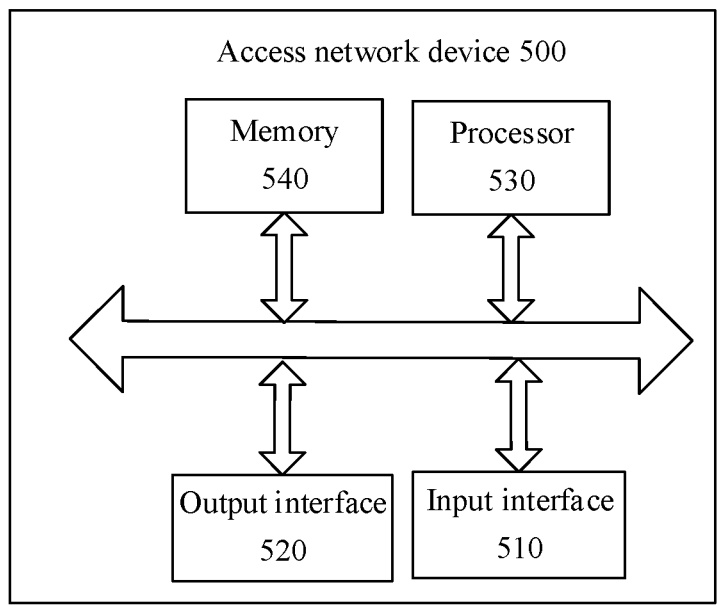
FIG. 6 is another schematic block diagram of an access network device according to an embodiment of the disclosure.

As shown in FIG. 6, an embodiment of the disclosure also provides an access network device 500. The access network device 500 may be the access network device 300 in FIG. 4, and may be configured to execute corresponding contents of the access network device in the method 100 in FIG. 2. The access network device 500 includes an input interface 510, an output interface 520, a processor 530 and a memory 540. The input interface 510, the output interface 520, the processor 530 and the memory 540 may be connected through a bus system. The memory 540 is configured to store a program, an instruction or a code. The processor 530 is configured to execute the program, instruction or code in the memory 540 to control the input interface 510 to receive a signal, control the output interface 520 to transmit a signal and complete operations in the method embodiments.

In such a manner, according to the network device of the embodiment of the disclosure, after the access network device determines that paging failed, a CN device is notified to initiate paging, so that data transmission reliability may be improved. It is to be understood that, in the embodiment of the disclosure, the processor 530 may be a Central Processing Unit (CPU) and the processor 530 may also be another universal processor, a digital signal processor, an application specific integrated circuit, a field-programmable gate array or another programmable logic device, discrete gate or transistor logic device and discrete hardware component and the like. The universal processor may be a microprocessor or the processor may also be any conventional processor and the like.

The memory 540 may include a Read-Only Memory (ROM) and a Random Access Memory (RAM) and provides an instruction and data for the processor 530. A part of the memory 540 may further include a nonvolatile RAM. For example, the memory 540 may further store information of a device type.

In an implementation process, each content of the method may be completed by an integrated logic circuit of hardware in the processor 530 or an instruction in a software form. The contents of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 540. The processor 530 reads information in the memory 540 and completes the contents of the method in combination with hardware. No more detailed descriptions will be made herein to avoid repetitions.

In a specific implementation mode, the receiving unit in the access network device 300 may be implemented by the input interface 510 in FIG. 6, the first determination unit and second determination unit in the access network device 300 may be implemented by the processor 530 in FIG. 6, and the transmitting units, i.e., the first transmitting unit, the second transmitting unit, the third transmitting unit and the fourth transmitting unit, in the access network device 300 may be implemented by the output interface 520 in FIG. 6.

Figure 7:
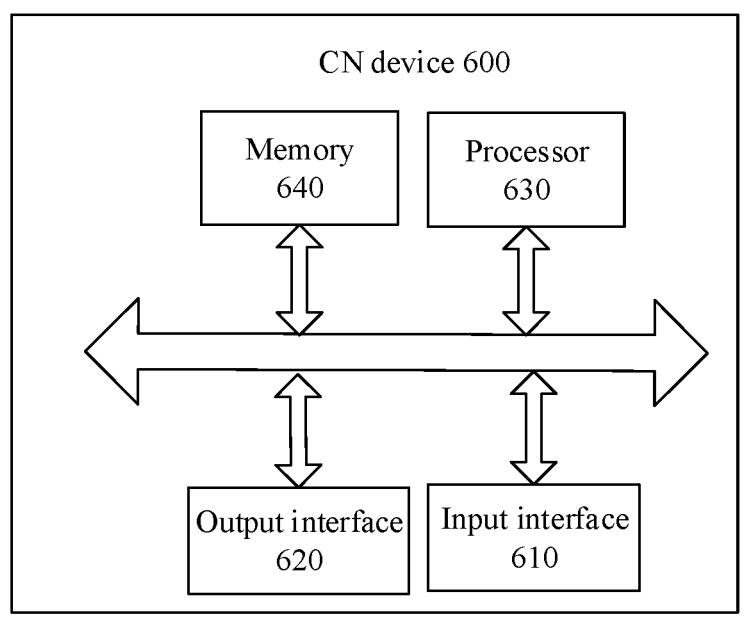
FIG. 7 is another schematic block diagram of a CN device according to an embodiment of the disclosure.

As shown in FIG. 7, an embodiment of the disclosure also provides a CN device 600. The CN device 600 may be the access network device 400 in FIG. 5, and may be configured to execute corresponding contents of the CN device in the method 200 in FIG. 3. The CN device 600 includes an input interface 610, an output interface 620, a processor 630 and a memory 640. The input interface 610, the output interface 620, the processor 630 and the memory 640 may be connected through a bus system. The memory 640 is configured to store a program, an instruction or a code. The processor 630 is configured to execute the program instruction or code in the memory 640 to control the input interface 610 to receive a signal, control the output interface 620 to transmit a signal and complete operations in the method embodiments.

In such a manner, according to the CN device of the embodiment of the disclosure, after an access network device determines that paging failed, the CN device is notified to initiate paging, so that data transmission reliability may be improved.

It is to be understood that, in the embodiment of the disclosure, the processor 630 may be a CPU and the processor 630 may also be another universal processor, a digital signal processor, an application specific integrated circuit, a field-programmable gate array or another programmable logic device, discrete gate or transistor logic device and discrete hardware component and the like. The universal processor may be a microprocessor or the processor may also be any conventional processor and the like.

The memory 640 may include a ROM and a RAM and provides an instruction and data for the processor 630. A part of the memory 640 may further include a nonvolatile RAM. For example, the memory 640 may further store information of a device type.

In an implementation process, each content of the method may be completed by an integrated logic circuit of hardware in the processor 630 or an instruction in a software form. The contents of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 640. The processor 630 reads information in the memory 640 and completes the contents of the method in combination with hardware. No more detailed descriptions will be made herein to avoid repetitions.

In a specific implementation mode, the paging unit, first transmitting unit, second transmitting unit and third transmitting unit in the CN device 400 may be implemented by the output interface 620 in FIG. 7, the release unit in the CN device 400 may be implemented by the processor 630 in FIG. 7, and the first receiving unit, second receiving unit and third receiving unit in the CN device 400 may be implemented by the input interface 610 in FIG. 7.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of each embodiment of the disclosure. The storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A paging failure processing method, comprising:
under a condition that downlink data for a terminal device is needed to be transmitted, determining, by an access network device, that paging initiated to the terminal device by the access network device failed; and
transmitting, by the access network device, first indication information to a Core Network (CN) device, wherein the first indication information indicates that paging initiated to the terminal device by the access network device failed, wherein the first indication information is carried in a connection release request message, and the connection release request message is used to request for releasing connection in relation to the terminal device between the CN device and the access network device;
after determining, by the access network device, that the paging initiated to the terminal device by the access network device is failed, transmitting, by the access network device, delivery-indication information to the CN device, wherein the delivery-indication information indicates that data cannot be delivered to the terminal device or the downlink data for the terminal device to be transmitted cannot be transmitted.

2. The method of claim 1, further comprising:
before determining, by the access network device, that the paging initiated to the terminal device by the access network device failed, transmitting, by the access network device, a paging message to the terminal device.

3. The method of claim 2, wherein transmitting, by the access network device, the paging message to the terminal device comprises:
under a condition that the access network device receives the downlink data for the terminal device from the CN device, transmitting, by the access network device, the paging message to the terminal device.

4. The method of claim 3, after determining, by the access network device, that the paging initiated to the terminal device by the access network device failed, further comprising:
transmitting, by the access network device, the downlink data for the terminal device received by the access network device back to the CN device.

5. The method of claim 2, wherein transmitting, by the access network device, the paging message to the terminal device comprises:
receiving, by the access network device, second indication information transmitted by the CN device, wherein the second indication information indicates that the downlink data for the terminal device is to be transmitted; and
transmitting, by the access network device, the paging message to the terminal device according to the second indication information.

6. An access network device, comprising:
a processor, configured to, under a condition that downlink data for a terminal device is needed to be transmitted, determine that paging initiated to the terminal device by the access network device is failed; and
an output interface, configured to transmit first indication information to a Core Network (CN) device, wherein the first indication information indicates that the paging initiated to the terminal device by the access network device failed;
wherein the first indication information is carried in a connection release request message, and the connection release request message is used to request for releasing connection in relation to the terminal device between the CN device and the access network device;
wherein the output interface is configured to transmit delivery-indication information to the CN device, wherein the delivery-indication information indicates that data cannot be delivered to the terminal device or the downlink data for the terminal device to be transmitted cannot be transmitted.

7. The access network device of claim 6, wherein
the output interface is configured to transmit a paging message to the terminal device.

8. The access network device of claim 7, wherein the output interface is further configured to:
under a condition that the access network device receives the downlink data for the terminal device from the CN device, transmit the paging message to the terminal device.

9. The access network device of claim 8, wherein
the output interface is configured to transmit the downlink data for the terminal device received by the access network device back to the CN device.

10. The access network device of claim 7, further comprising:
an input interface, configured to receive second indication information transmitted by the CN device, wherein the second indication information indicates that the is downlink data for the terminal device is to be transmitted, and
wherein the output interface is further configured to: transmit the paging message to the terminal device according to the second indication information.

11. A Core Network (CN) device, comprising:
an input interface, configured to receive first indication information transmitted by an access network device, wherein the first indication information indicates that paging initiated to a terminal device by the access network device failed; and a processor, configured to initiate paging to the terminal device according to the first indication information;

wherein the first indication information is carried in a connection release request message, wherein the connection release request message is used to request for releasing connection in relation to the terminal device between the CN device and the access network device;

wherein the input interface is configured to receive delivery-indication information transmitted by the access network device, wherein the delivery-indication information indicates that data cannot be delivered to the terminal device or the downlink data for the terminal device to be transmitted cannot be transmitted.

12. The CN device of claim 11, wherein the processor is further configured to release connection of the terminal device between the CN device and the access network device according to the connection release request message.

13. The CN device of claim 11, further comprising:

an output interface, configured to transmit the downlink data for the terminal device to the access network device.

14. The CN device of claim 13, wherein the input interface is configured to receive the downlink data for the terminal device transmitted back by the access network device.

15. The CN device of claim 11, wherein the output interface is configured to transmit second indication information to the access network device, wherein the second indication information indicates that the downlink data for the terminal device is to be transmitted.

* * * * *